United States Patent [19]

Takashima et al.

[11] Patent Number: 5,459,778
[45] Date of Patent: Oct. 17, 1995

[54] TELEPHONE EXCHANGE APPARATUS, AND METHOD OF CONNECTING CALLS THEREIN

[75] Inventors: Shoichi Takashima, Tokyo; Yoshihiro Tanigawa, Kawasaki, both of Japan

[73] Assignee: Canon Kabushiki Kaisha, Tokyo, Japan

[21] Appl. No.: 2,735

[22] Filed: Jan. 11, 1993

[30] Foreign Application Priority Data

Jan. 14, 1992 [JP] Japan .................................... 4-024583
Nov. 20, 1992 [JP] Japan .................................... 4-335094

[51] Int. Cl.⁶ ............................................. H04M 3/42
[52] U.S. Cl. ...................... 379/201; 379/216; 379/355; 379/234
[58] Field of Search ...................... 379/201, 265, 379/266, 213, 234, 209, 355, 354, 216, 100; 370/110.1

[56] References Cited

U.S. PATENT DOCUMENTS 4,633,041 12/1986 Boivie et al. ......................... 379/213
5,054,058 10/1991 Kakizawa .............................. 379/175
5,062,103 10/1991 Davidson et al. ...................... 379/265

Primary Examiner—Ahman Matar
Attorney, Agent, or Firm—Morgan & Finnegan

[57] ABSTRACT

Telephone directory data that has been stored in a telephone exchange apparatus is retrieved by a specific extension terminal to select the dial number of a party. When an ordinary extension terminal other than the specific extension terminal calls the specific extension terminal, an outgoing call is generated in the specific extension terminal on an outside line in accordance with the retrieved dial number and the ordinary extension terminal is connected to the outside line based on the dial number. Further, when a cordless telephone accommodated in an extension of the telephone exchange is designated from the specific extension terminal and the specific extension terminal retrieves and selects a dial number, the cordless telephone calls the specific extension terminal so that a call based upon the dial number can be made from the cordless telephone.

12 Claims, 8 Drawing Sheets

| SECOND DIGIT \ FIRST DIGIT | 1 | 2 | 3 | 4 | 5 | 6 | 7 | 8 | 9 | 0 |
|---|---|---|---|---|---|---|---|---|---|---|
| 1 | A | B | C | D | E | F | G | H | I | J |
| 2 | K | L | M | N | O | P | Q | R | S | T |
| 3 | U | V | W | X | Y | Z | | | | |

TELEPHONE EXCHANGE APPARATUS, AND METHOD OF CONNECTING CALLS THEREIN

BACKGROUND OF THE INVENTION

1. Field of the Invention

This invention relates to a telephone exchange apparatus which accommodates a plurality of extensions, and to a method of connecting calls in this exchange apparatus.

2. Description of the Related Art

A telephone exchange apparatus having a telephone directory function is known in the art. When a call originates from an extension terminal connected to such a telephone exchange apparatus, an operator of the extension terminal retrieves stored telephone directory data by using the extension terminal and selects the dial number of the desired party to be called and then originates a call from the extension terminal in accordance with the selected dial number of the desired party.

The information stored as the telephone directory data includes not only dialing information indicative of telephone numbers but also comments (e.g., the company name of the other party) corresponding to the dialing information. The arrangement is such that this information is capable of being displayed on a display unit of the extension terminal in response to a command from the extension terminal.

The operation for retrieving a party's dial number is usually carried out solely by a special-purpose extension telephone, which is equipped with a display unit, accommodated by the telephone exchange apparatus. In actuality, dialing information, such as a party's facsimile telephone number, also is capable of being verified on the display unit of the special-purpose extension telephone without performing a call operation from this special-purpose extension telephone. After the dialing information and comments displayed on the display unit of the special-purpose extension telephone have thus been verified, the retrieved dial number is inputted to place an outgoing call by automatic calling performed by the special-purpose extension telephone or by a manual operation performed at another extension terminal.

Thus, in the example of the prior art described above, an outgoing call based upon telephone directory data stored in the telephone exchange apparatus cannot be performed from an ordinary extension terminal, such as a facsimile machine or cordless telephone, among the extension terminals connected to the telephone exchange apparatus. As a consequence, after displaying and verifying a party's facsimile number using the special-purpose extension telephone, the user of the facsimile machine or cordless telephone must write down this number and place the call by dialing the number manually from the facsimile machine or cordless telephone while referring to the written number. Thus, operability is poor.

Furthermore, not only telephone directory data but also single-touch dial numbers and abbreviated dial numbers that have been registered in the telephone exchange apparatus cannot be used at an extension telephone other than the special-purpose extension telephone.

SUMMARY OF THE INVENTION

Accordingly, an object of the present invention is to provide a telephone exchange apparatus, as well as a method of connecting calls in the apparatus, in which an outgoing call is capable of being placed from any extension terminal by utilizing telephone directory data stored by the telephone exchange apparatus.

Another object of the present invention is to provide a telephone exchange apparatus, as well as a method of connecting calls in the apparatus, in which a call is placed from an ordinary extension terminal to a special-purpose extension terminal, at which time an outgoing call can be placed to an outside line automatically from the ordinary extension terminal based upon a dial number retrieved by the special-purpose extension terminal.

Still another object of the present invention is to provide a telephone exchange apparatus, as well as a method of connecting calls in the apparatus, in which a call can be placed to an outside line from a cordless telephone, which is connected to the telephone exchange apparatus via a host machine, by utilizing telephone directory data stored in the telephone exchange apparatus.

A further object of the present invention is to provide a telephone exchange apparatus, as well as a method of connecting calls in the apparatus, in which a call can be placed to an outside line from a facsimile machine, which is connected to the telephone exchange apparatus, by utilizing telephone directory data stored in the telephone exchange apparatus.

According to the present invention, the foregoing objects are attained by providing a telephone exchange apparatus accommodating a plurality of extensions, comprising memory means for storing a plurality of dial numbers, selecting means for selecting a dial number of the plurality of dial numbers, which has been stored in the memory means, in accordance with the first operation performed at the first extension terminal, call originating means for originating a call in accordance with the dial number, which has been selected by the selecting means, in response to the second operation performed at the second extension terminal other than the first extension terminal, and connecting means for connecting the second extension terminal to the party corresponding to the dial number selected by said selecting means.

Further, according to the present invention, the foregoing objects are attained by providing a call connecting method in a telephone exchange apparatus accommodating a plurality of extensions and having a memory which stores a plurality of dial numbers, comprising a step of selecting a dial number of a party by searching the memory from at least one specific extension terminal, a step of placing a call on an outside line, in accordance with the dial number of the party selected by the specific extension terminal, when the specific extension terminal has been designated and called from an extension terminal other than this specific extension terminal, and a step of connecting the outside line and this other extension terminal to make possible communication between this other extension terminal and the party specified by the dial number of the party.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

Figure 1:
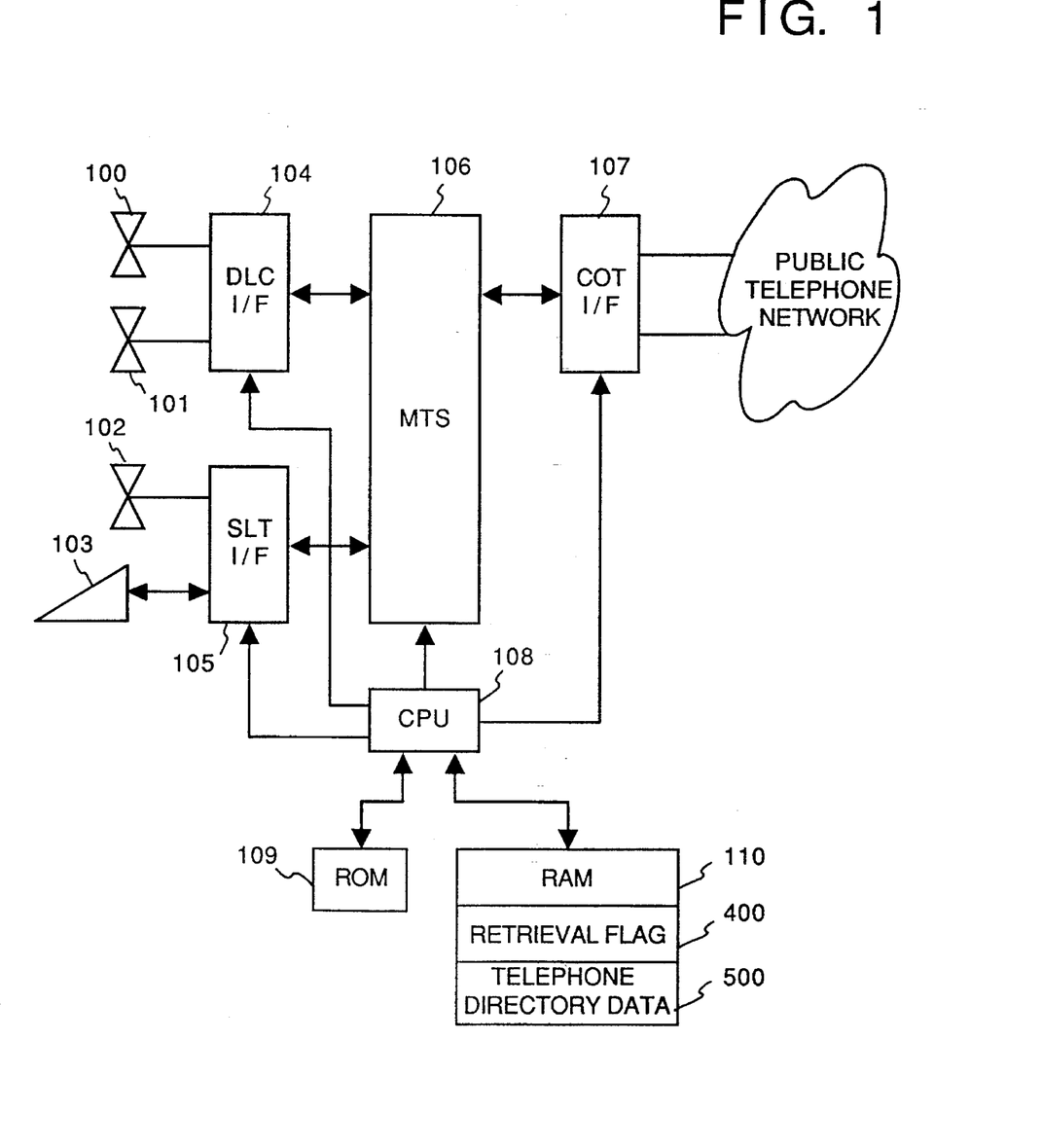
FIG. 1 is a block diagram illustrating the configuration of a telephone exchange system according to a first embodiment of the present invention.

FIG. 1 is a block diagram illustrating the configuration of a telephone exchange system according to a first embodiment of the present invention.

Shown in FIG. 1 are special-purpose extension telephones 100, 101 accommodated in a DLC interface 104, an individual telephone 102, which is an ordinary extension terminal, and a facsimile machine 103, which also is an ordinary extension terminal. The telephone 102 and facsimile machine 103 are accommodated in an SLT interface 105. A time-sharing channel (MTS) 106 is for performing time-shared control of channels between the extensions and outside lines. A COT interface 107 accommodates main wires from a public telephone network, a CPU 108 for controlling the overall telephone exchange system of this embodiment, a ROM 109 storing the control program of the CPU 108, and a RAM 110, which is used as a work area when the CPU 108 operates, for temporarily storing various data. As will be described below, the RAM 110 stores a retrieval flag 400 indicating whether a certain special-purpose extension terminal has retrieved and is displaying telephone directory data, and telephone directory data 500, which stores telephone numbers and comments, etc., in order to perform the function of a telephone directory. The area of the telephone directory data 500 is made non-volatile in order that the stored data will not be erased in the event of a power failure or the like.

Figure 2:
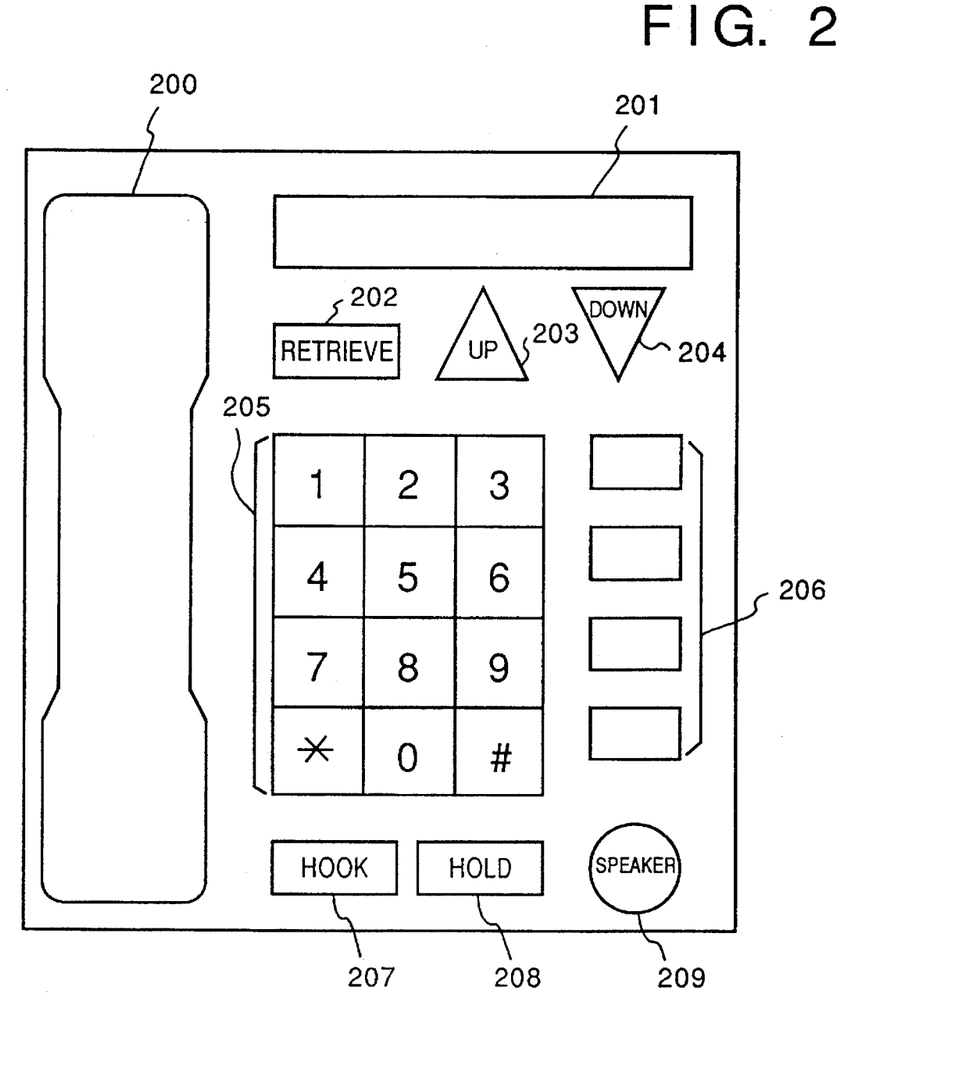
FIG. 2 is a plan view showing the arrangement of a control panel on a special-purpose extension telephone according to the first embodiment.

FIG. 2 is a plan view showing the control panel on the special-purpose extension telephones 100, 101. It should be noted that the special-purpose extension telephones 100, 101 are identically constructed, and therefore only one is illustrated here.

As shown in FIG. 2, the telephone has a hand set 200 for performing a telephone conversion, and a display unit 201, such as an LCD, for displaying telephone numbers and the like. The control panel includes a retrieval button 202 for commanding the starting and stopping of retrieval of telephone directory data by utilizing the telephone directory function possessed by the telephone exchange system of the embodiment. Also included are buttons 203, 204 for commanding the scrolling of displayed data on the display unit 201 when telephone directory data is retrieved. The button 203 is for scrolling the displayed data up, and the button 204 is for scrolling the displayed data down. Dial buttons 205 are for inputting numerical information such as telephone numbers, an outside-line button 206 is for commanding an outgoing call on an outside line, a hook button 207 is for transmitting a hooking signal when a telephone conversion is carried out on an outside line, a hold button 208 is for putting a call on hold, and a speaker button 209 is used when establishing the off-hook state without picking up the hand set 200.

Figure 3:
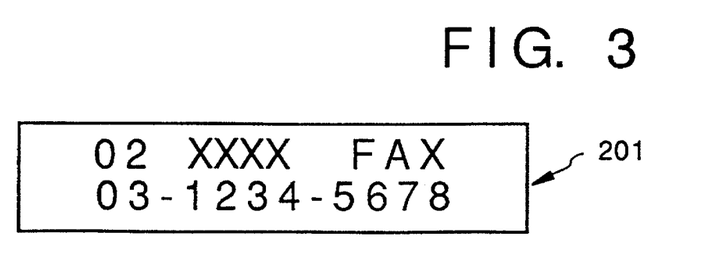
FIG. 3 is a view showing an example of retrieved data displayed on a display unit according to the first embodiment.

FIG. 3 illustrates an example in which the telephone directory is searched by the special-purpose extension telephone 100 at the time of retrieval of the telephone directory data, and the result of retrieval is displayed on the display unit 201.

In FIG. 3, "02" indicates the order in which the telephone directory data is stored, "xxxxFAX" indicates comment information, such as the name of a party, stored together with the telephone number, and "03-1234-5678" indicates the telephone number.

Figure 4:
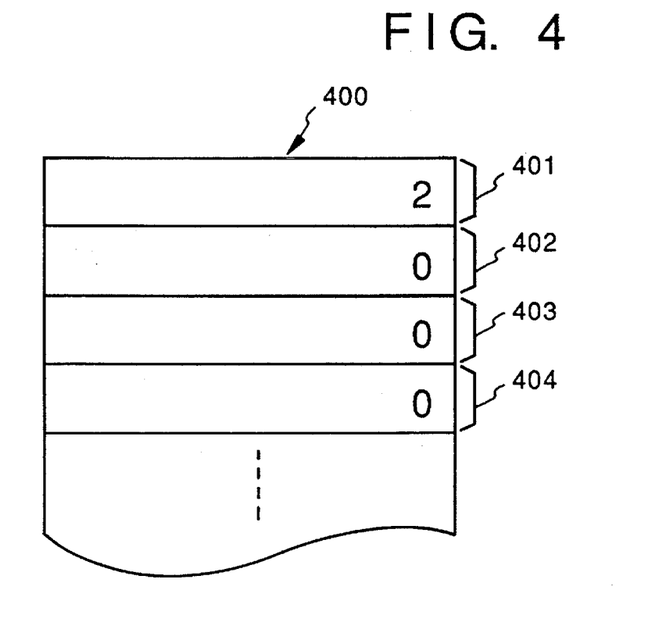
FIG. 4 is a view showing areas of retrieval flags provided within a RAM according to the first embodiment.

FIG. 4 is a diagram showing the data structure of the retrieval flag section 400 provided in the RAM 110. These flags are set to values other than "0" when telephone directory data is retrieved and the retrieved data is displayed on the display unit 201.

Flag areas 401, 402, 403 . . . in the retrieval flag section 400 correspond to respective ones of the extensions. More specifically, flag area 401 corresponds to extension 100, and flag area 402 corresponds to extension 101. Similarly, a flag area 403 corresponds to extension 102, and a flag area 404 corresponds to extension 103.

The value of each flag area is "0" if the special-purpose extension telephone thereof has not retrieved the telephone directory data. If the value is other than "0", then a numerical value which indicates the order of storage of the directory data of the party currently being retrieved is stored. In this case, the order of storage of the telephone directory data retrieved by the special-purpose extension telephone 100 is "02", as will be understood from FIG. 3, and therefore "2" has been stored in the flag area 401 corresponding to the special-purpose extension telephone 100.

Figure 5:
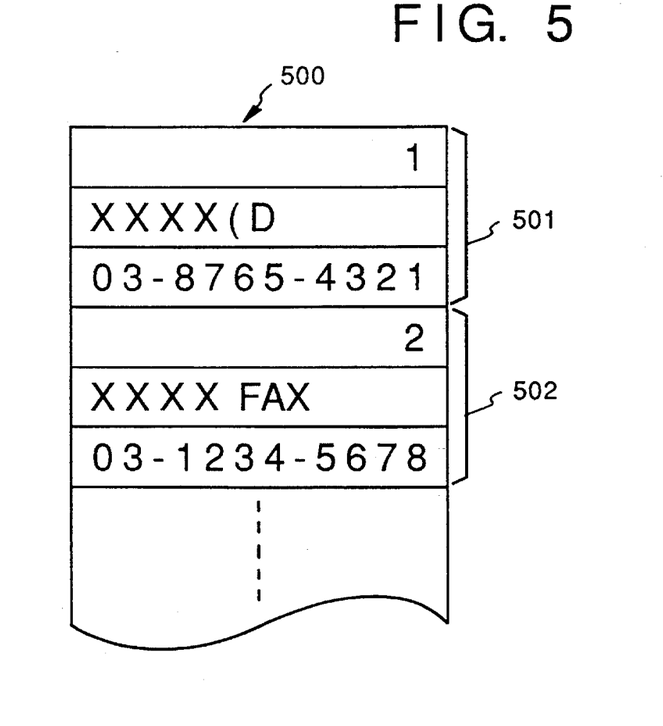
FIG. 5 is a view showing the structure of telephone directory data provided within a RAM according to the first embodiment.

FIG. 5 illustrates the data structure of the telephone directory data 500 stored in the RAM 110.

An area 501 is the storage area of one set of telephone directory data. If the content of this area is "1", this indicates the order in which the telephone directory data has been stored, "xxxx(D" indicates a comment, such as the name of the party, and "03-8765-4321" indicates the dial number of the party.

On the basis of the example of the display shown in FIG. 3, it will be understood that the content of area 502 is being displayed. Thus, it is understood from the fact that the flag area 401 is "2" that the special-purpose extension telephone 100 is retrieving the telephone directory data 500, and that the area 502 of telephone directory data has been retrieved and is being displayed.

Figure 6:
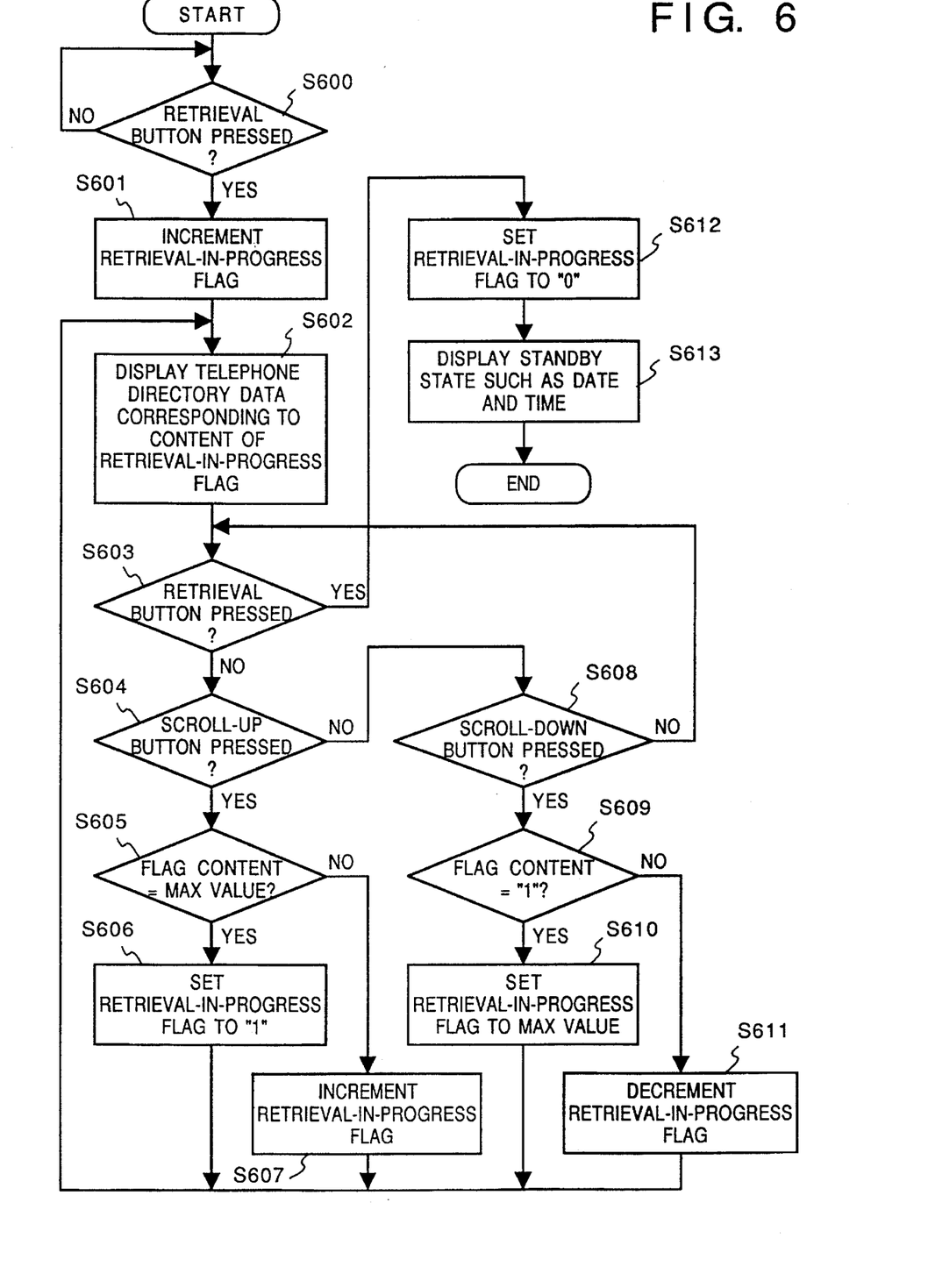
FIG. 6 is a flowchart showing retrieval processing according to the first embodiment.
Figure 7:
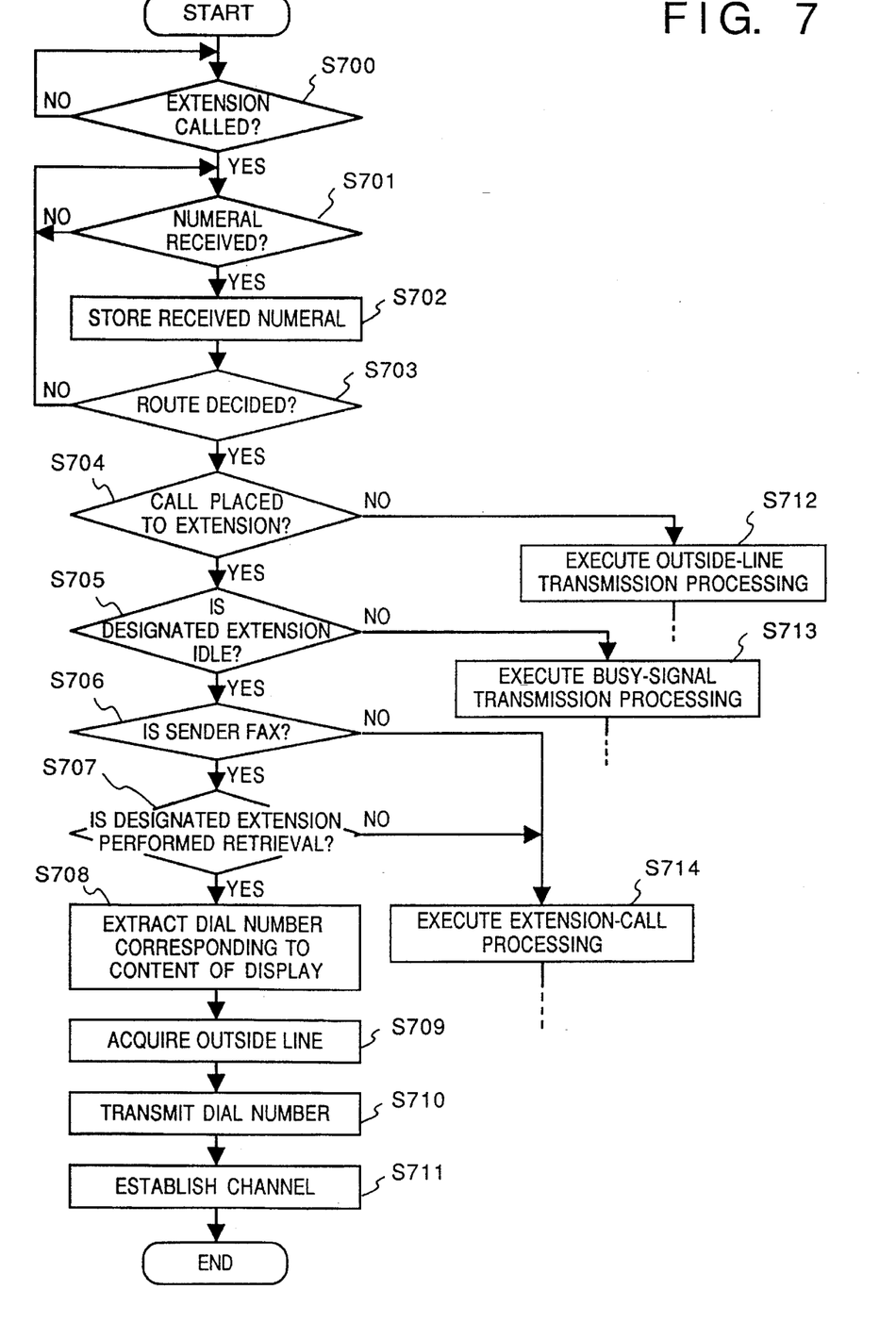
FIG. 7 is a flowchart showing call processing which utilizes telephone directory data from an extension terminal according to the first embodiment.

FIGS. 6 and 7 are flowcharts illustrating the control procedure executed by the CPU 108 of the first embodiment of the invention. The control program for executing this processing is stored in the ROM 109.

First, at step S600, it is determined whether the retrieval button 202 of special-purpose telephone 100 or 101 has been pressed. If this button has been pressed, then the program proceeds to step S601, at which the retrieval flag corresponding to this special-purpose extension telephone is incremented. If the retrieval button 202 of special-purpose extension telephone 100, for example, is pressed, "1" is added to the content of area 401. Since the content of this storage area 401 is "0" prior to the start of retrieval, the value of this area becomes "1" owing pressing of the retrieval button 202.

Next, the program proceeds to step S602. Here the telephone directory data (501 in FIG. 5) corresponding to the content of area 401 is retrieved, sent to the special-purpose extension telephone 100 and displayed on the display unit 201. Thus, the content of area 501 within the telephone directory data 500 is transmitted in conformity with the content "1" in area 401.

Next, the program proceeds to step S603, where it is determined whether the retrieval button 202 has been pressed again. If the button 202 has been pressed again, this signifies the end of retrieval, "0" is set in the retrieval flag section 400 (area 401 in this case) at step S612 and the corresponding special-purpose extension telephone 100 is instructed to display data (e.g., date and time) indicative of standby.

If it is found at step S603 that the retrieval button 202 has not been pressed, then it is determined at step S604 whether the scroll-up button 203 has been pressed. If the answer is YES, then the value of the retrieval flag 400 corresponding to this extension terminal is compared with the maximum number of items of telephone directory data 500 stored (step S605). If the value of the flag is equal to the maximum number, then the program proceeds to step S606, at which "1" is set in the same area of the retrieval flag 400. If the maximum number has not yet been attained, the program proceeds to step S607, where 1 is added to the corresponding area of the retrieval flag 400, after which the program returns to step S602.

If it is found at step S604 that the scroll-up button 203 has not been pressed, then the program proceeds to step S608, where it is determined whether the scroll-down button 204 has been pressed. If the answer is YES, then the value of retrieval flag 400 corresponding to this extension is compared with "1" (step S609). If the value of this retrieval flag is equal to "1", then the maximum number of items of telephone directory data 500 stored in the telephone exchange system is set in the flag area (step S610). If the value of this retrieval flag is not equal to "1", then 1 is subtracted from the content of the corresponding retrieval flag 400 at step S611 and the program returns to step S602.

Thus, such information as the telephone numbers of other parties can be displayed and scrolled on the display unit 201 of the special-purpose extension telephones 100, 101 so that the telephone number, etc., of the desired party can be retrieved.

Call processing executed by the CPU 108 of the first embodiment will now be described with reference to flowchart of FIG. 7.

First, at step S700, it is determined whether a call has been placed from any of the extension terminals. When a call is detected, the program proceeds to step S701, at which input of a dial signal from the extension that has placed the call is awaited. When the dial signal is received, the program proceeds to step S702, at which numerical information indicative of the received dial signal is stored in the RAM 110. Next, at step S703, the stored numerical information is analyzed to determine the route of the call, namely whether the call is routed to another extension or to an outside line. This can be realized by judging that the call is routed to outside line when the first digit of the numerical information is "0", by way of example. In a case where numerical information of a number of digits sufficient for making this judgment has not been received, the program returns to step S701.

When the route is thus decided at step S703, the program proceeds to step S704. When a call is to be placed on an outside line, processing is executed for placing the outgoing call on the outside line (step S712). If a call is to be placed to an extension, it is determined at step S705 whether the extension terminal designated by this numerical value is idle (i.e., whether the extension terminal is ready or busy). When the designated extension is busy, busy processing is executed for sending a busy signal to the extension terminal that has placed the call.

If the called extension terminal is found to be ready at step S705, the program proceeds to step S706, where it is determined whether the extension that has placed the call is the facsimile machine 103. If this extension is the facsimile machine 103, then the program proceeds to step S707, at which it is determined whether the called extension is retrieving the telephone directory data 500. The determination as to whether the telephone directory data 500 is being retrieved can be made as follows: If, by way of example, the called extension is the special-purpose extension telephone 100, reference is made to the area 401 of RAM 110 shown in FIG. 4. If the content of this area is other than "0", a judgment is made to the effect that retrieval is in progress at this special-purpose extension telephone.

When it is found at step S706 that the calling extension is not the facsimile machine 103, or when it is found at step S707 that the called extension is not retrieving the telephone directory data 500, the program proceeds to step S714, at which ordinary processing for connecting extensions is executed. For example, processing for calling an extension is executed.

If it is found at step S706 that the calling extension is the facsimile machine and, moreover, it is found at step S707 that the called extension is a special-purpose extension telephone that is retrieving the telephone directory data 500, then this special-purpose extension reads the telephone number of the retrieved party from the telephone directory data 500 and stores the telephone number in the work area of RAM 110 at step S708. The program then proceeds to step S709, at which an outside line is acquired using this telephone number, and then to step S710, at which the call is placed on the outside line based upon this telephone number. Then, at step S711, a channel is established connecting the communication device of the called party, the calling extension (e.g., the facsimile machine 103) and the outside line, and communication becomes possible by an acknowledge response from the called party.

When the special-purpose extension telephone 100, for example, retrieves the telephone directory data 500, as mentioned above, an ordinary extension telephone such as the facsimile machine 103 dials the extension number of the special-purpose extension telephone 100, whereby a call is capable of being placed on the outside line using the telephone number that the special-purpose extension telephone 100 has retrieved.

In another embodiment, the retrieval flag 400 is not partitioned into areas (401, 402, 403, etc.) so as to correspond to the extension terminals but is treated as being the only data. Then, when one of the special-purpose extension telephones has retrieved the telephone directory data 500, this special-purpose extension telephone is capable of using the retrieved dial number to make the outgoing call in place of another extension terminal. In this case, it can be so arranged that a special number of the telephone exchange system is dialed to make the outgoing call in place of another extension terminal without designating the special-purpose extension telephone that has retrieved the dial number.

The facsimile machine accommodated as the extension terminal is not limited to a G3 machine. It goes without saying that the same effects can be obtained even if a G4 machine is connected via a digital extension interface. A cordless telephone can be applied in stead of the facsimile machine.

Further, the present invention can be applied not only in retrieval of telephone directory data but also in a case where the telephone number in a single-touch dialing memory area or abbreviated-dialing memory area of the RAM 110 is selected.

Thus, in accordance with the first embodiment, as described above, dialing data obtained by searching a memory is designated from another extension, whereby it is possible to make a transmission from a facsimile machine, which is accommodated in a telephone exchange system, in accordance with a dial number that has been stored in a memory. This has the effect of making it possible for the facsimile machine to utilize a memory function.

In addition, it is unnecessary to write down the retrieved facsimile number of another party's facsimile machine. This makes it possible for a facsimile machine to be used through a simple operation.

Figure 8:
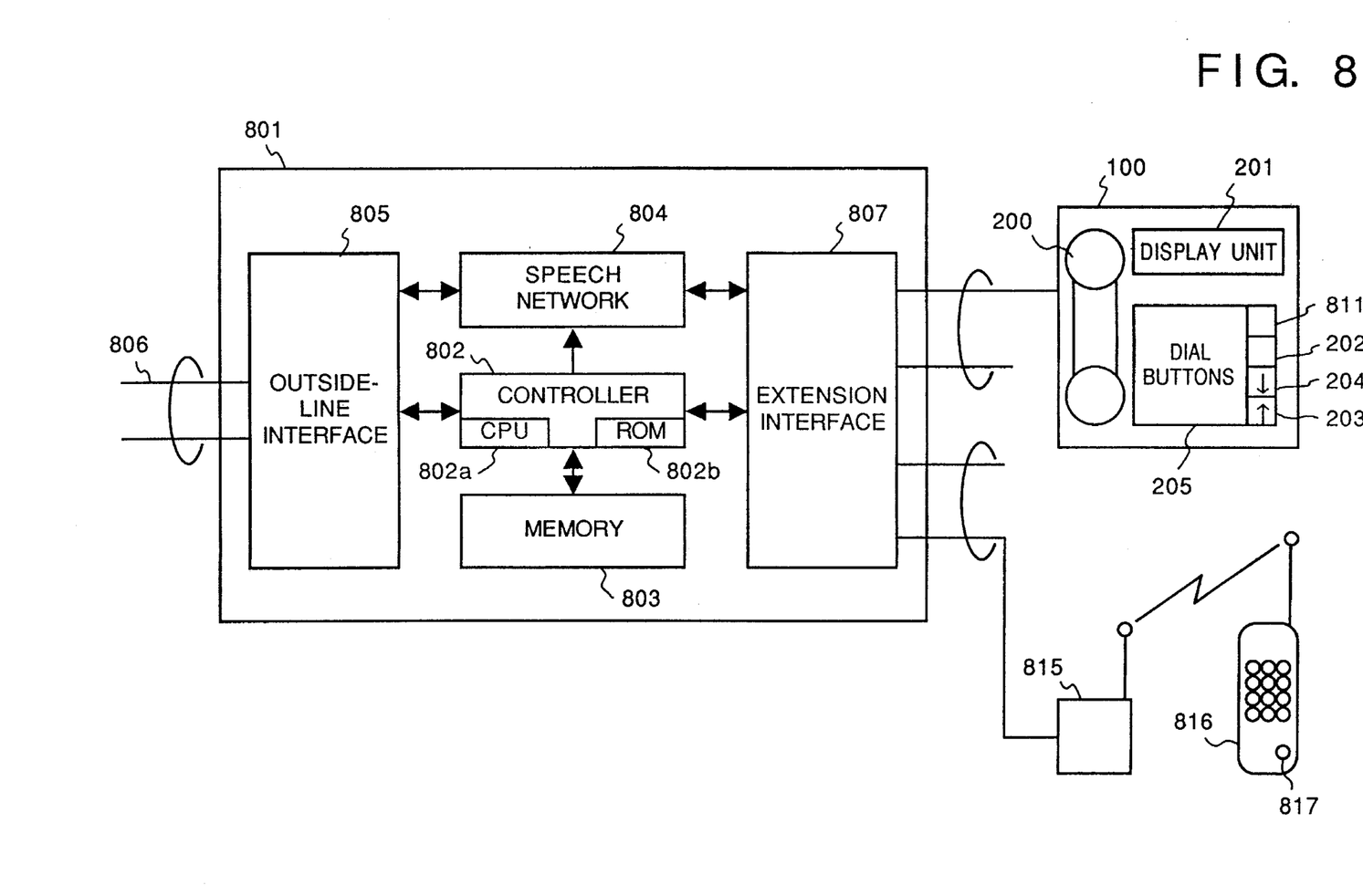
FIG. 8 is a block diagram illustrating the configuration of a telephone exchange system according to a second embodiment of the present invention.

FIG. 8 is a block diagram showing the configuration of a telephone exchange system according to a second embodiment of the present invention.

Shown in FIG. 8 is a main unit 801 for controlling the overall telephone exchange system. The main unit 801 includes a controller 802 having a CPU 802a for controlling the overall unit and a ROM 802b for storing the control program of the CPU 802a, a memory 803 which stores telephone directory data and the like, a speech network 804 for connecting a channel between an outside line 806 and each extension telephone, an outside-line interface 805 for detecting an incoming call from the outside line 806 and transmitting a dial number to the outside line 806, and an extension interface 807 for detecting the operating state of each extension telephone and sending various data to the extension telephones. Examples of the extension telephones connected to the telephone exchange system via the extension interface 807 are the special-purpose extension telephone 100 and a host machine 815 of a cordless telephone.

The special-purpose extension telephone 100 is provided with a cordless-telephone button 811, which is for designating the cordless telephone, in addition to the buttons mentioned earlier, namely the display unit 201 for displaying telephone directory data and the like, the dial buttons 205 for inputting telephone numbers and the like, the retrieval button 202 of starting retrieval of the telephone directory, the scroll-down button ("↓" button) 204 for retrieving the next dial number, and the scroll-up button ("↑" button) 203 for retrieving the immediately preceding dial number.

A cordless telephone or slave 816 capable of communicating wirelessly with the host machine 815 is provided with a call button 817 for transmitting an off-hook/on-hook signal to the main unit 801.

Figure 9:
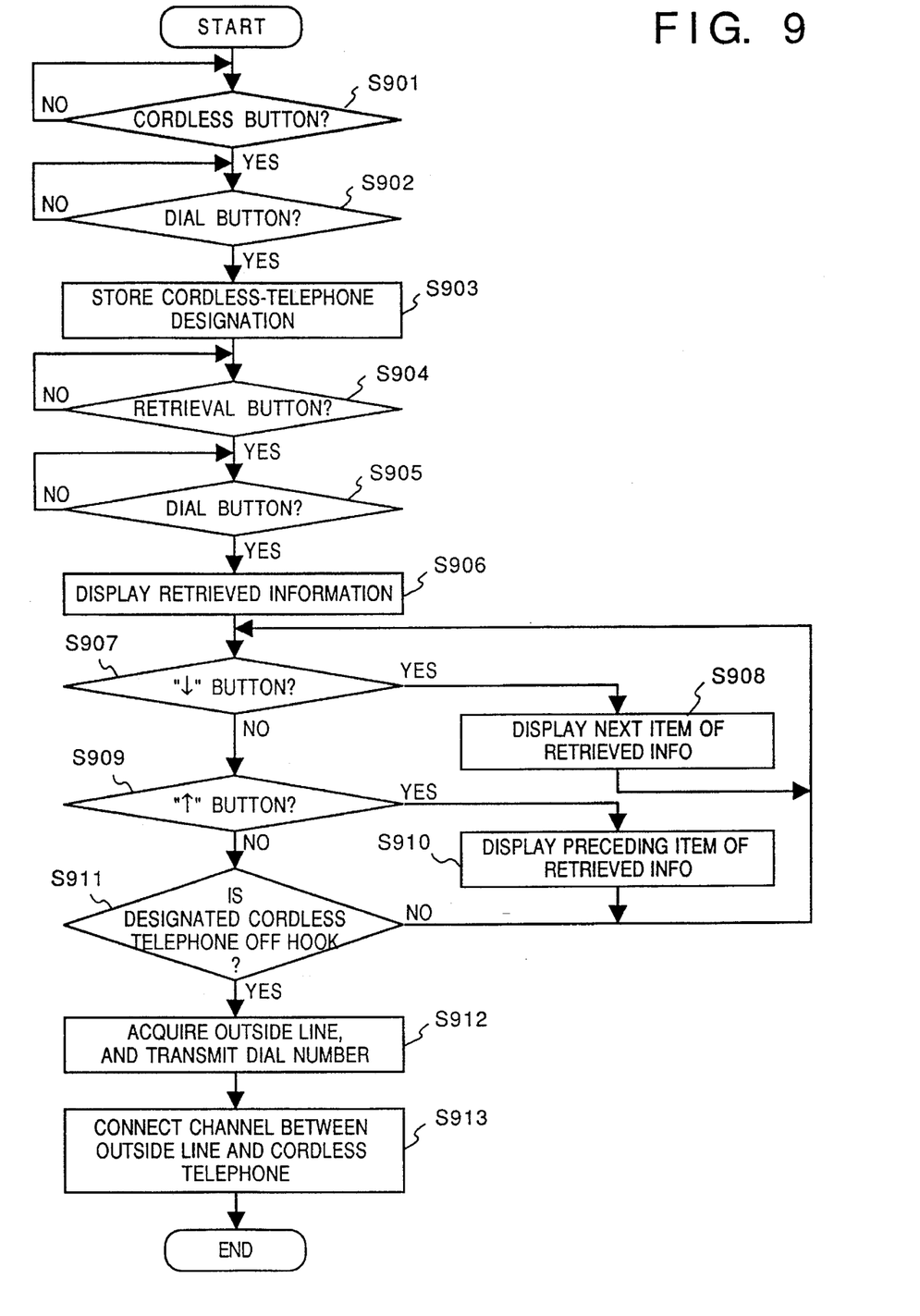
FIG. 9 is a flowchart showing call processing from a cordless telephone according to the second embodiment.

FIG. 9 is a flowchart for describing the operation of the controller 802 of the telephone exchange system according to the second embodiment of the present invention. The control program for executing this processing is stored in the ROM 802b of the controller 802.

First, at step S901, monitoring is performed via the extension interface 807 to determine whether the cordless-telephone button 811 of the special-purpose extension telephone 100 has been pressed. If pressing of this button is detected, then the program proceeds to step S902, at which the system sees whether numerical information has been inputted by pressing of the dial buttons 205. If the dial buttons 205 are pressed, then the program proceeds to step S903, at which the entered numerical value is stored in the memory 803 as a number designating the cordless telephone. It should be noted that this operation can be started by entering a specific number of the telephone exchange system at step S901 rather than by pressing the cordless-telephone button 811. Further, the number for designating the cordless telephone may be the extension number of the cordless telephone. Correspondence between cordless telephones and the numbers for designating them is registered beforehand in the memory 803.

Next, the program proceeds to step S904, at which it is determined via the extension interface 807 whether the retrieval button 202 of the special-purpose extension telephone 100 has been pressed. If this button has been pressed, then the program proceeds to step S905, at which a two-digit input from the dial buttons 205 following depression of the retrieval button 202 is awaited. If two-digit numerical information is entered, the program proceeds to step S906, at which the names of destinations of transmission, which have a character (see FIG. 10) indicated by the numerical values at the beginning thereof, as well as the dial numbers of these destinations, are retrieved from the telephone directory data of the memory 803 and then displayed on the display unit 201 of the special-purpose extension telephone 100 via the extension interface 807.

Figure 10:
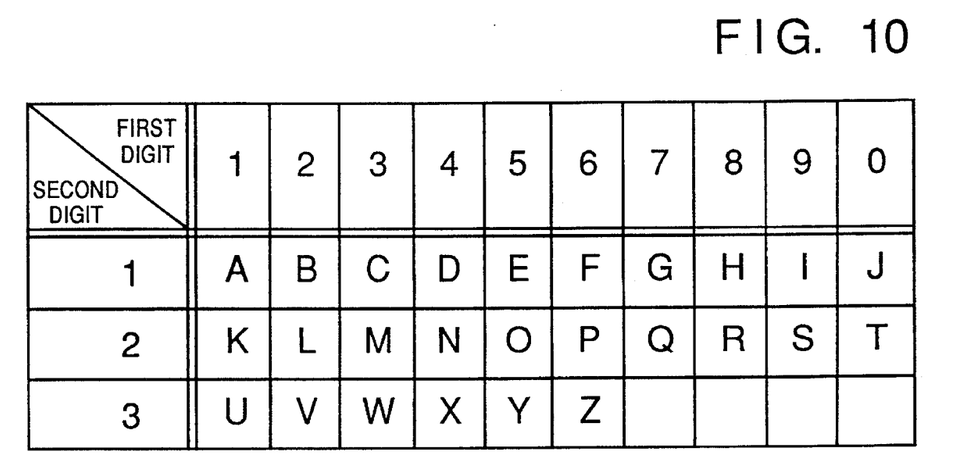
FIG. 10 is a view showing correspondence between two-digit numerals, which are inputted at the time of retrieval, and characters in accordance with the second embodiment.

FIG. 10 illustrates the correspondence between characters and the two-digit numerals entered at step S905. If '7' and "1" are entered, for example, the character "G" is designated and the names of destinations beginning with "G" are retrieved.

Next, at steps S907~S910, it is determined via the extension interface 807 whether the "↓" button 204 or "↑" button 203 on the special-purpose extension telephone 100 has been pressed. The next item of retrieved information is displayed when the "↓" button 204 is pressed, and the preceding item of retrieved information is displayed when the "↑" button 203 is pressed.

If it is detected at step S911 that the cordless telephone whose number has been stored in the memory 803 by the processing of step S903 is off the hook, e.g., if the call button 817 of the slave 816 in FIG. 8 is pressed, then the program proceeds to step S912, at which an idle outside line is acquired via the outside-line interface 805. At this time the dial number displayed on the display unit 201 of the special-purpose extension telephone 100 is sent to the outside line 806. Next, the program proceeds to step S913, at which the speech network 804 is controlled to establish a channel between the acquired outside line and the cordless telephone 816.

In the second embodiment described above, the arrangement is such that first the cordless-telephone button 811 on the special-purpose extension telephone 100 is pressed to designate the cordless telephone 816, after which the operation for retrieving the telephone directory data is performed. However, an arrangement may be adopted in which the retrieval of the telephone directory data is performed first, after which the cordless telephone is designated.

Further, depending upon the number of cordless telephones connected, the number of dial-number digits entered at step S902 may be one. Alternatively, the input of the dial number may be omitted.

Further, rather than designating the cordless telephone, a predetermined number ("15", for example) may be entered at step S902. Then, when this predetermined number ("15") is entered from the cordless telephone at step S911, the program may proceed to the processing of steps S912 onward to make the connection from this cordless telephone to the outside line.

Furthermore, the method of retrieving the telephone directory data is not limited to that of the foregoing embodiment. For example, retrieval may be performed by a communication method based upon the district, facsimile or telephone of the called party. An example of the data stored as the telephone directory data may be abbreviated-dialing numbers or single-touch dialing numbers in addition to telephone numbers and the names of parties to be called.

An example of extension terminal capable of the foregoing transmission is not limited to a cordless telephone. The extension terminal may be a facsimile machine or telephone, as in the first embodiment.

In accordance with the second embodiment, as described above, dialing data selected at a certain extension is designated from another extension. As a result, a transmission can be made from an extension terminal such as a facsimile machine or cordless telephone, which is accommodated in a telephone exchange apparatus (which includes the main unit of a push-button-type telephone device), in accordance with a dial number stored in the memory of the telephone exchange apparatus.

Further, it is unnecessary to write down the retrieved number of another party. This makes it possible for a facsimile machine or cordless telephone to be used through a simple operation.

The present invention can be applied to a system constituted by a plurality of devices or to an apparatus comprising a single device. Furthermore, it goes without saying that the invention is applicable also to a case where the object of the invention is attained by supplying a program which implements the invention.

As many apparently widely different embodiments of the present invention can be made without departing from the spirit and scope thereof, it is to be understood that the invention is not limited to the specific embodiments thereof except as defined in the appended claims.

What is claimed is:

1. A telephone exchange apparatus accommodating a plurality of extension terminals, comprising:

memory means for storing a plurality of dial numbers;

selecting means for selecting a dial number of the plurality of dial numbers which have been stored in said memory means, in accordance with a first operation performed at a first extension terminal;

call originating means for originating a call in accordance with the dial number, which has been selected by said selecting means, in response to a second operation performed at a second extension terminal other than the first extension terminal; and connecting means for connecting the second extension terminal to a party corresponding to the selected dial number selected by said selecting means.

2. The apparatus according to claim 1, wherein said call originating means originates a call in accordance with a dial number selected when said first extension terminal is selected based on the second operation at said second extension terminal.

3. A telephone exchange apparatus accommodating a plurality of extension terminals and having a memory which stores a plurality of dial numbers, comprising:

retrieval control means for searching the memory from a specific extension terminal and selecting a dial number of a party;

call control means for calling on an outside line, in accordance with the dial number of a party selected by the specific extension terminal, when the specific extension terminal is selected by an extension terminal other than said specific extension terminal; and exchange control means for connecting the outside line and said other extension terminal to make possible communication between said other extension terminal and the party specified by the dial number.

4. A telephone exchange apparatus having a first extension terminal which accommodates a cordless telephone, comprising:

memory means for storing at least dial numbers and information relating to names of party's corresponding to the dial numbers;

selecting means for selecting the cordless telephone from a second extension terminal;

retrieving means for retrieving a dial number, which has been stored in said memory means, based on a retrieving signal from the second extension terminal;

call originating means for calling on an outside line, by using the dial number retrieved by said retrieving means, when an off-hook signal has been detected from the selected cordless telephone which is accommodated in a first extension of the telephone exchange apparatus; and connecting means for connecting a channel between the cordless telephone and the outside line.

5. A call connecting method in a telephone exchange apparatus accommodating a plurality of extension terminals and having a memory which stores a plurality of dial numbers, comprising the steps of:

selecting a dial number of a party from the plurality of dial numbers stored in the memory by a first extension terminal;

placing a call on an outside line, in accordance with the dial number of the party selected by the first extension terminal, when the first extension terminal is selected from a second extension terminal other than the first extension terminal; and connecting the outside line and the second extension terminal to make possible communication between the second extension terminal and the party specified by the dial number.

6. A call connecting method in a telephone exchange apparatus having a memory which stores at least dial numbers and information relating to names of parties corresponding to these dial numbers, comprising the steps of:

selecting a cordless telephone from a first extension terminal;

retrieving a dial number from said memory based on a retrieving signal from the first extension terminal;

calling on an outside line by using the dial number retrieved from said memory, when an off-hook signal has been detected from the selected cordless telephone Which is accommodated in a second extension of the telephone exchange apparatus; and connecting a channel between the cordless telephone and the outside line.

7. An outgoing call method in a private exchange apparatus, comprising the steps of:

specifying a dial number based on a first operation at a first extension terminal;

detecting a second operation at a second extension terminal;

making an outgoing call to an external line according to the dial number specified in the specifying step based on said second operation detected in the detecting step; and connecting the second extension terminal and the external line.

8. An outgoing call method according to claim 7, wherein said dial number, specified in the specifying step, is selected from a plurality of dial numbers stored in a memory of the exchange apparatus.

9. An outgoing call method according to claim 7, wherein said second operation, detected in the detecting step, includes an operation on a hook switch.

10. An outgoing call method according to claim 7, wherein said first extension terminal is selected in said second operation.

11. An outgoing call method according to claim 7, wherein a predetermined key operation at a facsimile machine is detected in said detecting step as said second operation at said second extension terminal.

12. An outgoing call method according to claim 7, wherein a predetermined key operation at a cordless telephone is detected in said detecting step as said second operation at the second extension terminal.

* * * * *

UNITED STATES PATENT AND TRADEMARK OFFICE
CERTIFICATE OF CORRECTION

PATENT NO. : 5,459,778
DATED : October 17, 1995
INVENTOR(S) : Takashima, et al

It is certified that error appears in the above-indentified patent and that said Letters Patent is hereby corrected as shown below:

Column 11, line 5, delete "Which" and insert therefor -- which --

Signed and Sealed this

Sixteenth Day of January, 1996

Attest:

BRUCE LEHMAN

*Attesting Officer*  *Commissioner of Patents and Trademarks*